(12) United States Patent
Kim et al.

(10) Patent No.: US 12,384,380 B2
(45) Date of Patent: Aug. 12, 2025

(54) APPARATUS AND METHOD OF DETECTING HANDS ON/OFF OF STEERING WHEEL

(71) Applicant: HL MANDO CORPORATION, Pyeongtaek-si (KR)

(72) Inventors: Hoseok Kim, Seoul (KR); Taeyoung Lee, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 29 days.

(21) Appl. No.: 18/206,478

(22) Filed: Jun. 6, 2023

(65) Prior Publication Data
US 2024/0253642 A1    Aug. 1, 2024

(30) Foreign Application Priority Data
Jan. 30, 2023 (KR) .................. 10-2023-0011487

(51) Int. Cl.
*B60W 40/08*    (2012.01)
*B60W 40/105*    (2012.01)
*B60W 50/16*    (2020.01)
*B60W 50/00*    (2006.01)
*B60W 50/14*    (2020.01)

(52) U.S. Cl.
CPC .......... *B60W 40/08* (2013.01); *B60W 40/105* (2013.01); *B60W 50/16* (2013.01); *B60W 2050/0057* (2013.01); *B60W 2050/143* (2013.01); *B60W 2050/146* (2013.01); *B60W 2510/202* (2013.01); *B60W 2540/223* (2020.02)

(58) Field of Classification Search
CPC ...................................................... B60Q 9/008
See application file for complete search history.

(56) References Cited

U.S. PATENT DOCUMENTS

| | | | | |
|---|---|---|---|---|
| 2014/0371989 A1* | 12/2014 | Trimboli | ............... | B60W 40/09 701/41 |
| 2023/0052279 A1* | 2/2023 | Shin | ...................... | B60W 10/20 |
| 2024/0217579 A1* | 7/2024 | Kirschbaum | ............ | B62D 6/10 |

FOREIGN PATENT DOCUMENTS

| | | |
|---|---|---|
| JP | 2019-1270 A | 1/2019 |
| JP | 6950859 B1 | 10/2021 |
| JP | 2021-195106 A | 12/2021 |

OTHER PUBLICATIONS

Office Action issued on Apr. 30, 2025 for corresponding Korean Patent Application No. 10-2023-0011487, along with English machine translation (13 pages).

* cited by examiner

*Primary Examiner* — James J Yang
(74) *Attorney, Agent, or Firm* — Hauptman Ham, LLP

(57) ABSTRACT

The present disclosure detects hands on/off by performing a frequency analysis based on a torque value of a steering wheel, so that it is possible to improve performance of hands on/off determination by using only an existing torque sensor even without requiring an additional sensor for detecting hands on/off.

22 Claims, 7 Drawing Sheets

APPARATUS AND METHOD OF DETECTING HANDS ON/OFF OF STEERING WHEEL

CROSS-REFERENCE TO RELATED APPLICATIONS

This application claims benefit and priority to Korean Patent Application No. 10-2023-0011487, filed on Jan. 30, 2023, with the Korean Intellectual Property Office, the disclosure of which is incorporated herein in its entirety by reference.

TECHNICAL FIELD

The present disclosure relates to an apparatus and a method of detecting hands on/off, and more particularly, an apparatus and a method of detecting hands on/off of a steering wheel.

BACKGROUND

With the proliferation of vehicles with an autonomous driving function, it's becoming increasingly important for drivers to make hands on/off decisions when an autonomous driving function is in operation. The driver's hands on/off decision is important because Level 3 and lower autonomous driving systems require driver intervention. That is, in the event of a sudden unexpected event, the driver should be able to intervene appropriately. To accomplish this, Level 3 and lower autonomous driving systems require the driver to keep their hands on the steering wheel, even when the autonomous driving function is in operation.

The method of determining hands on/off in the related art simply compares the measurement value of a torque sensor to a predetermined threshold value to determine hands on/off. However, this method has a problem in that despite the driver holds the steering wheel, the case where the measurement value of the torque sensor is less than a threshold value is erroneously determined as hands off. To compensate for the problem, there is a method of adding a separate sensor to the steering wheel for hands on/off detection. However, this method requires an additional sensor to detect hands on/off.

SUMMARY

The present disclosure is conceived in response to the background art, and has been made in an effort to provide an apparatus and a method of detecting hands on/off of a steering wheel, which perform an analysis of a frequency based on a torque value of a steering wheel to detect hands on/off.

Other unstated objects of the present disclosure may be further contemplated to the extent that they can be readily inferred from the detailed description below and the effects.

An exemplary embodiment of the present disclosure provides an apparatus for detecting hands on/off of a steering wheel, the apparatus including: a torque sensor for sensing a torque value of a steering wheel; and an Electronic Control Unit (ECU) for detecting whether a driver grips the steering wheel by performing a frequency analysis based on the torque value received from by the torque sensor.

Herein, the ECU may perform the frequency analysis based on the torque value to obtain an amplitude value in a reference frequency domain, and detect whether the driver grips the steering wheel based on the amplitude value and an amplitude reference value.

Herein, the ECU may perform the frequency analysis based on the torque value for a predetermined analysis time to obtain the amplitude value in the reference frequency domain.

Herein, the ECU may convert the torque value for the analysis time from a time domain to a frequency domain to obtain the amplitude value in the reference frequency domain.

Herein, in response to a determination that the amplitude value is less than the amplitude reference value, the ECU may determine that the steering wheel is in a hands off state in which the driver does not grip the steering wheel, and in response to a determination that the amplitude value is equal to or greater than the amplitude reference value, the ECU may determine that the steering wheel is in a hands on state in which a driver grips the steering wheel.

Herein, based on a sliding window method which has the analysis time as a window size and moves by a predetermined number of times at intervals of a measurement period of the torque sensor, the ECU may obtain a hands off counter based on the amplitude value and the amplitude reference value, and detect whether the driver grips the steering wheel based on the hands off counter.

Herein, in response to a determination that the amplitude value obtained based on the torque value during the analysis time corresponding to a current window is less than the amplitude reference value, the ECU may increase the value of the hands off counter, and in response to a determination that the amplitude value is equal to or greater than the amplitude reference value, the ECU may decrease the value of the hands off counter.

Herein, in response to a determination that the hands off counter obtained based on the sliding window method is equal to or greater than a predetermined counter reference value, the ECU may determine that the steering wheel is in a hands off state in which the driver does not grip the steering wheel, and in response to a determination that the hands off counter is less than the counter reference value, the ECU may determine that the steering wheel is in a hands on state in which the driver grips the steering wheel.

Herein, the ECU may obtain the reference frequency domain and the amplitude reference value corresponding to a current speed of a vehicle based on reference information in which the reference frequency domain and the amplitude reference value are mapped for each vehicle speed.

Herein, in response to a determination that it is determined that the steering wheel is in a hands off state in which the driver does not grip the steering wheel, the ECU may provide warning information when a predetermined warning condition is met.

Herein, the warning condition may include at least one of a case where a current speed of a vehicle is greater than a predetermined reference speed, a case where an Advanced Driver Assistance Systems (ADAS) function is operating, a case where the vehicle is traveling straight, and a case where the vehicle is traveling in reverse.

Another exemplary embodiment of the present disclosure provides a method of detecting hands on/off of a steering wheel, the method including: obtaining the steering wheel's torque value sensed by a torque sensor; and detecting whether a driver grips the steering wheel by performing a frequency analysis based on the torque value.

Herein, the detecting may include performing a frequency analysis based on the torque value to obtain an amplitude value in a predetermined reference frequency domain, and detecting whether the driver grips the steering wheel by using the amplitude value and a predetermined amplitude reference value.

Herein, the detecting may include performing the frequency analysis based on the torque value for a predetermined analysis time to obtain the amplitude value in the reference frequency domain.

Herein, the detecting may include converting the torque value for the analysis time from a time domain to a frequency domain to obtain the amplitude value in the reference frequency domain.

Herein, the detecting may include determining that the steering wheel is in a hands off state in which the driver does not grip the steering wheel in response to a determination that the amplitude value is less than the amplitude reference value, and determining that the steering wheel is in a hands on state in which the driver grips the steering wheel in response to a determination that the amplitude value is equal to or greater than the amplitude reference value.

Herein, the detecting includes, based on a sliding window method which has the analysis time as a window size and moves by a predetermined number of times at intervals of a measurement period of the torque sensor, obtaining a hands off counter based on the amplitude value and the amplitude reference value, and detecting whether the driver grips the steering wheel based on the hands off counter.

Herein, the detecting may include increasing the value of the hands off counter in response to a determination that the amplitude value obtained based on the torque value during the analysis time corresponding to a current window is less than the amplitude reference value, and decreasing the value of the hands off counter in response to a determination that the amplitude value is equal to or greater than the amplitude reference value.

Herein, the detecting may include determining that the steering wheel is in a hands off state in which the driver does not grip the steering wheel in response to a determination that the hands off counter obtained based on the sliding window method is equal to or greater than a predetermined counter reference value, and determining that the steering wheel is in a hands on state in which the driver grips the steering wheel in response to a determination that the hands off counter is less than the counter reference value.

Herein, the detecting may include obtaining the reference frequency domain and the amplitude reference value corresponding to a current speed of the vehicle based on reference information in which the reference frequency domain and the amplitude reference value are mapped for each vehicle speed.

Another exemplary embodiment of the present disclosure provides a non-transitory computer readable medium storing a computer program, when executed by a processor, to cause the processor to: receive a torque value of a steering wheel from a torque sensor; perform a frequency analysis based on the torque value received from the torque sensor; and detect whether a driver grips the steering based on a result of the frequency analysis.

The computer program, when executed by the processor, may further cause the processor to perform the frequency analysis based on the torque value to obtain an amplitude value in a predetermined reference frequency domain, and detect whether the driver grips the steering wheel based on the amplitude value and a predetermined amplitude reference value.

The computer program, when executed by the processor, may further cause the processor to perform the frequency analysis based on the torque value for a predetermined analysis time to obtain the amplitude value in the reference frequency domain.

The computer program, when executed by the processor, may further cause the processor to convert the torque value for the analysis time from a time domain to a frequency domain to obtain the amplitude value in the reference frequency domain.

The computer program, when executed by the processor, may further cause the processor to: in response to a determination that the amplitude value is less than the amplitude reference value, determine that the steering wheel is in a hands off state in which the driver does not grip the steering wheel; and in response to a determination that the amplitude value is equal to or greater than the amplitude reference value, determine that the steering wheel is in a hands on state in which a driver grips the steering wheel.

The computer program, when executed by the processor, may further cause the processor to: based on a sliding window method which has the analysis time as a window size and moves by a predetermined number of times at intervals of a measurement period of the torque sensor, obtain a hands off counter based on the amplitude value and the amplitude reference value, and detect whether the driver grips the steering wheel based on the hands off counter.

According to the apparatus, the method, and the computer program stored in the medium of detecting hands on/off of a steering wheel according to the exemplary embodiments of the present disclosure, hands on/off is detected by performing a frequency analysis based on a torque value of a steering wheel, so that it is possible to improve performance of hands on/off determination by using only an existing torque sensor even without requiring an additional sensor for detecting hands on/off.

The effects of the present disclosure are not limited to those mentioned above, and other effects not mentioned will be apparent to those skilled in the art from the following description.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
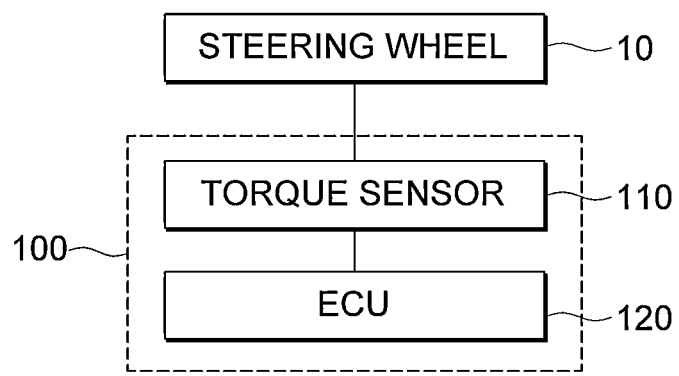
FIG. 1 is a block diagram illustrating an apparatus for detecting hands on/off of a steering wheel according to an embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment of the present disclosure will be described in detail with reference to the accompanying drawings. The advantages and characteristics of the present disclosure, and a method for achieving the advantages and characteristics will become clear by referring to the exemplary embodiment, which is described below in detail, together with the accompanying drawings. However, the present disclosure is not limited to exemplary embodiments disclosed herein but will be implemented in various forms, and the exemplary embodiments are provided so that the present disclosure is completely disclosed, and a person of ordinary skilled in the art can fully understand the scope of the present disclosure, and the present disclosure will be defined only by the scope of the appended claims. Throughout the specification, the same reference numeral indicates the same constituent element.

Unless otherwise defined, all of the terms (including technical and scientific terms) used in the present specification may be used as a meaning commonly understandable by those skilled in the art. Further, terms defined in a generally used dictionary shall not be construed as being ideal or excessive in meaning unless they are clearly defined specially.

In the present specification, the terms "first," "second," and the like are intended to distinguish one component from another component and are not intended to limit the scope of the claims. For example, a first component may be named as a second component, and similarly, a second component may be named as a first component.

In this specification, identifiers (for example, a, b, and c) for each operation are used for convenience of description only, and the identifiers do not describe the order of the operations, and the operations may occur in any order other than that specified unless the context clearly indicates a particular order. That is, this means that each operation may occur in the same order as specified, may be performed substantially simultaneously, or may be performed in reverse order.

In the present specification, expressions, such as "has," "may have," "includes," or "may include" refer to the presence of a corresponding feature (for example, a numerical value, function, operation, or constituent element, such as a component) and do not exclude the presence of additional features.

The term " . . . unit" used in the present exemplary embodiment refers to software or a hardware component, such as a processor, a Field Programmable Gate Array (FPGA) or an Application Specific Integrated Circuit (ASIC), and the " . . . unit" serves a specific role. However, the " . . . unit" is not limited to software or hardware. The " . . . unit" may also be configured to be included in an addressable storage medium, and may be configured to reproduce one or more processors. Thus, in one example, " . . . unit" includes constituent elements, such as software constituent elements, object-oriented software constituent elements, class constituent elements, and task constituent elements, processes, functions, properties, procedures, subroutines, segments of program code, drivers, firmware, microcode, circuits, data structures, and variables. The components and the function provided in the " . . . unit" may be combined into a smaller number of components and " . . . unit" or further separated into additional components and " . . . units".

Hereinafter, with reference to the accompanying drawings, an exemplary embodiment of an apparatus and a method of detecting hands on/off of a steering wheel according to the present disclosure will be described in detail.

First, an apparatus for detecting hands on/off of a steering wheel according to an exemplary embodiment of the present disclosure will be described with reference to FIGS. 1 to 6.

Figure 2:
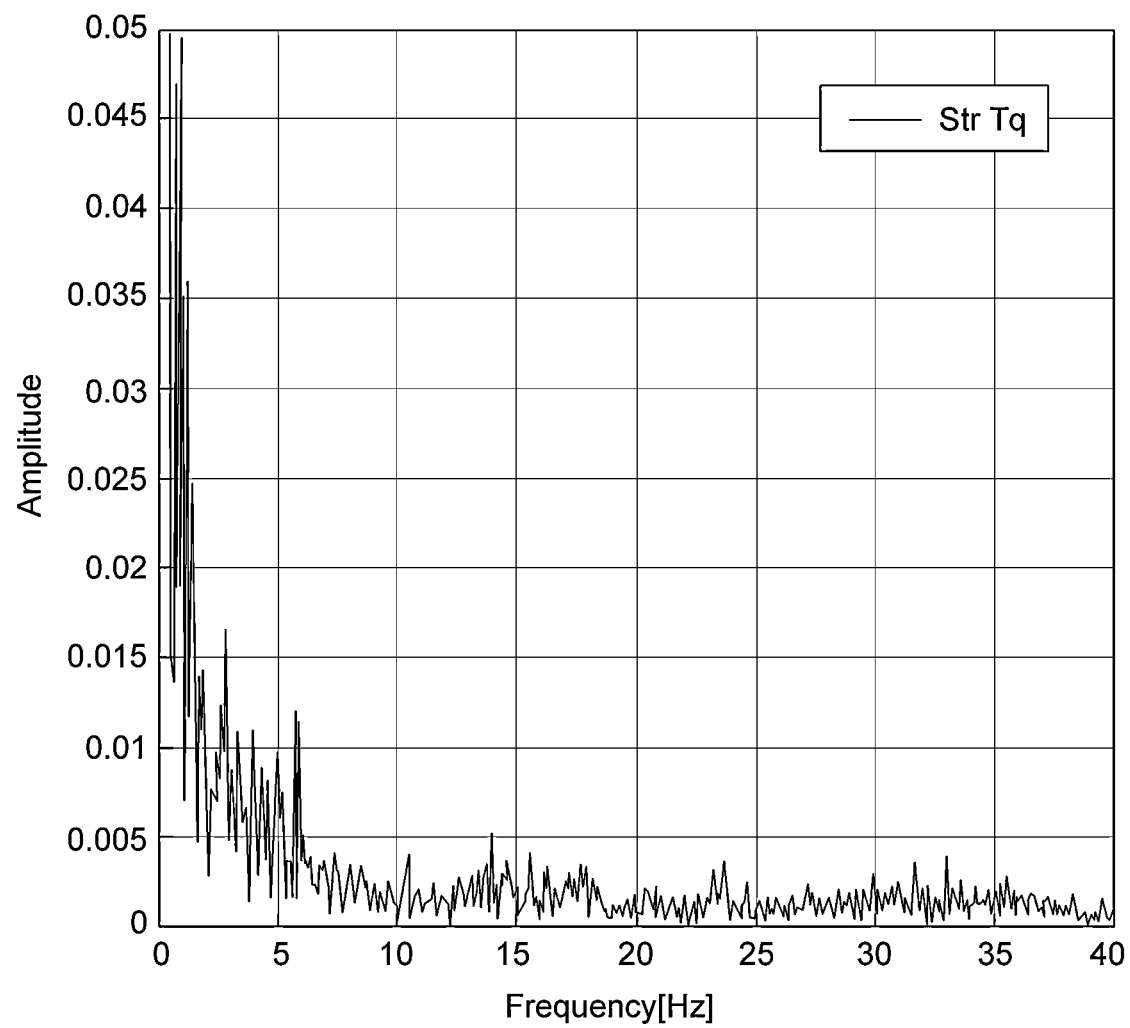
FIG. 2 is a diagram illustrating an example of a torque value analysis result in a hands on state according to an embodiment of the present disclosure.
Figure 3:
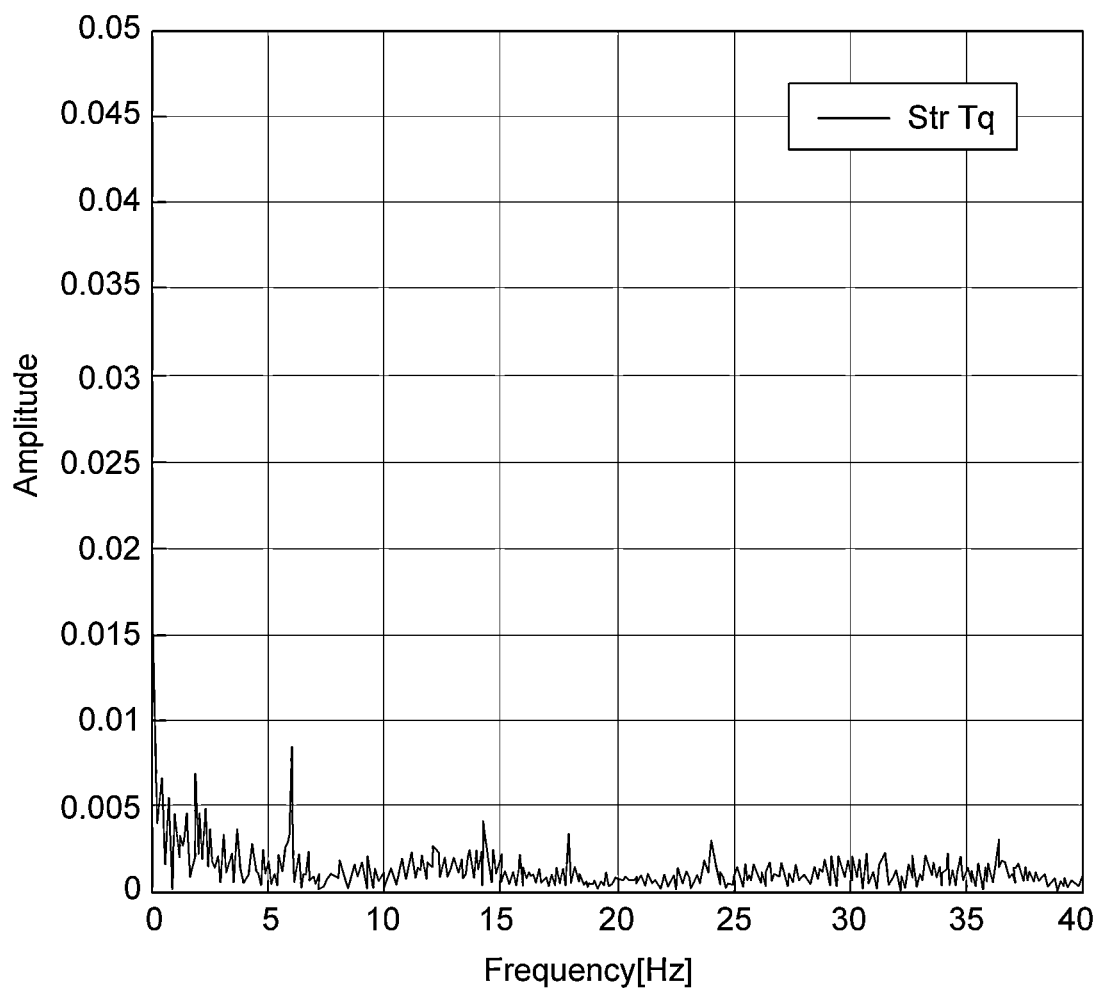
FIG. 3 is a diagram illustrating an example of a torque value analysis result in a hands off state according to an embodiment of the present disclosure.
Figure 4:
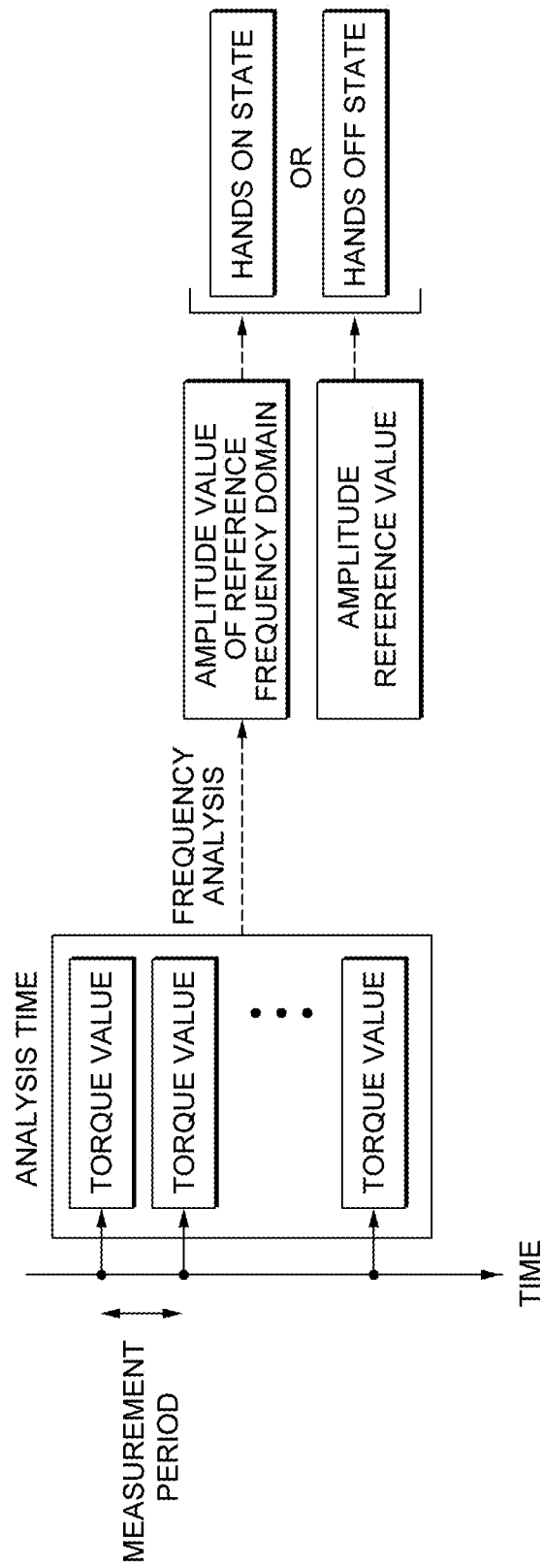
FIG. 4 is a drawing illustrating an example of an operation of detecting hands on/off of a steering wheel according to an embodiment of the present disclosure.
Figure 5:
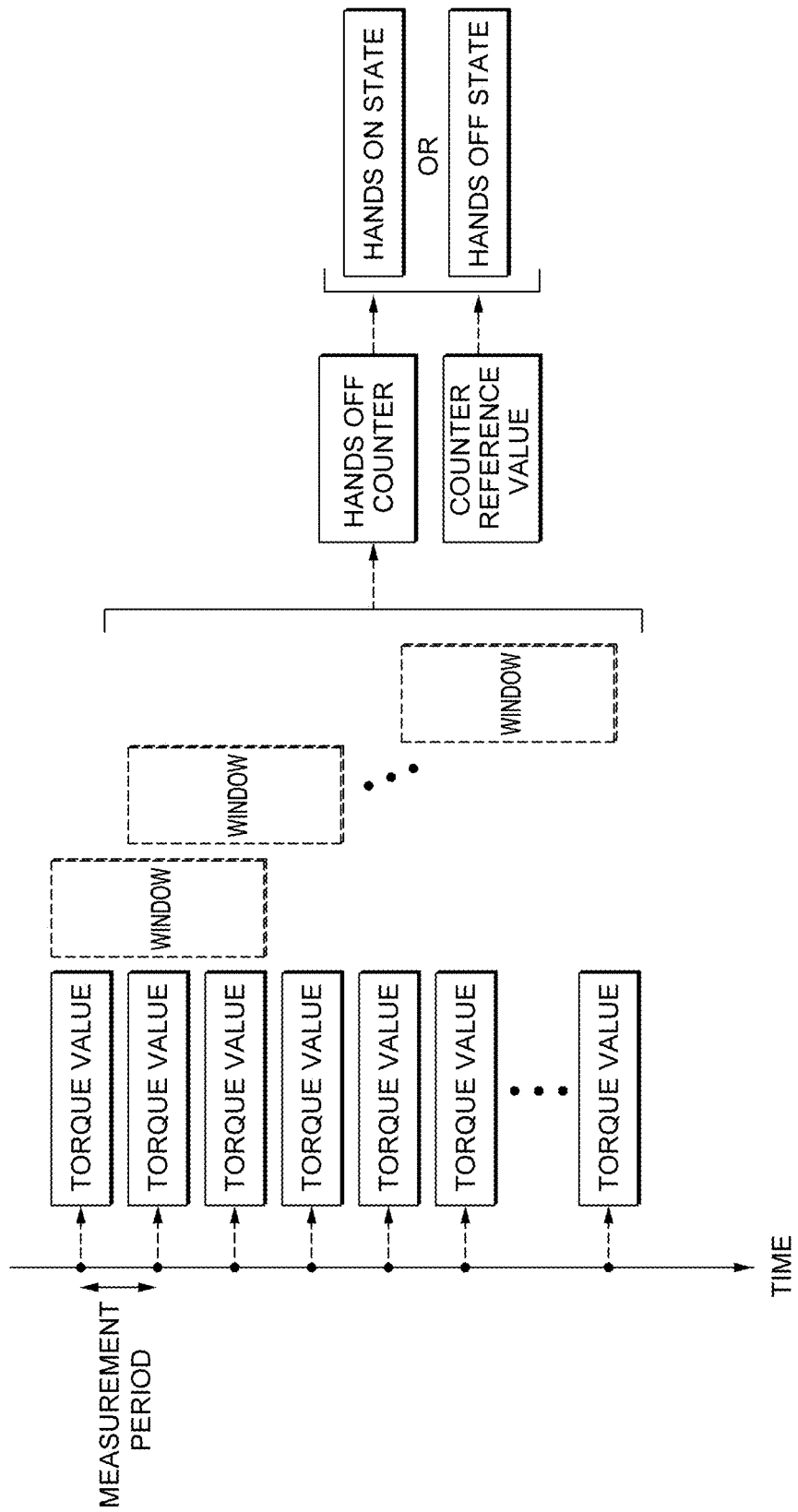
FIG. 5 is a drawing illustrating another example of an operation of detecting hands on/off of a steering wheel according to an embodiment of the present disclosure.
Figure 6:
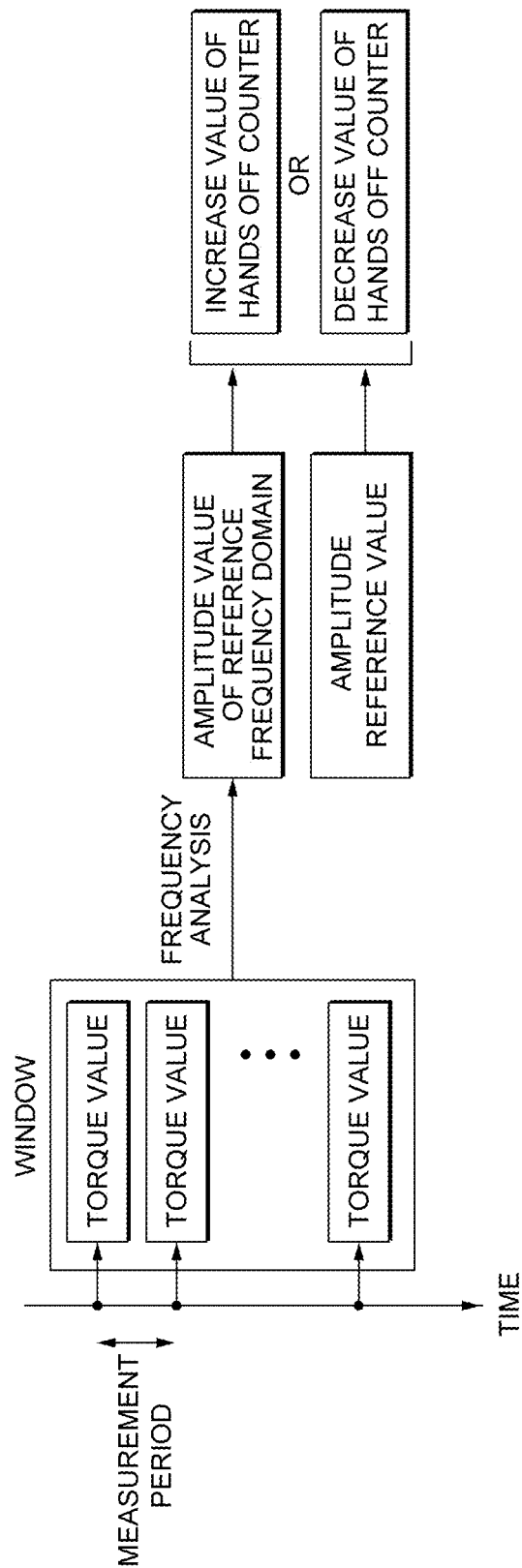
FIG. 6 is a diagram illustrating a torque value analysis process for one window shown in FIG. 5.

FIG. 1 is a block diagram illustrating an apparatus for detecting hands on/off of a steering wheel according to an embodiment of the present disclosure, FIG. 2 is a diagram illustrating an example of a torque value analysis result in a hands on state according to an embodiment of the present disclosure, FIG. 3 is a diagram illustrating an example of a torque value analysis result in a hands off state according to an embodiment of the present disclosure, FIG. 4 is a drawing illustrating an example of an operation of detecting hands on/off of a steering wheel according to an embodiment of the present disclosure, FIG. 5 is a drawing illustrating another example of an operation of detecting hands on/off of a steering wheel according to an embodiment of the present disclosure, and FIG. 6 is a diagram illustrating a torque value analysis process for one window shown in FIG. 5.

Referring to FIG. 1, an apparatus 100 for detecting hands on/off of a steering wheel (hereinafter, referred to as the "hands on/off detecting apparatus") according to an embodiment of the present disclosure may detect hands on/off by performing a frequency analysis based on a torque value of a steering wheel 10.

Accordingly, the present disclosure may improve the performance of hands on/off determination by using only an existing torque sensor, even without requiring an additional sensor for hands on/off detection.

In more detail, the result of the frequency analysis of the torque values in the hands on state with the driver grips the steering wheel 10 shows that the amplitude values are large in the region of 2 Hz or below, as shown in FIG. 2. For example, the amplitude values are larger in the region of 2 Hz or below as compared to the region of greater than 2 Hz. It should be noted that 2 Hz is an exemplary predetermined frequency or an exemplary threshold frequency which may depend on, for example, the type of torque sensor being used or the steering wheel, and the predetermined frequency thus may not be limited to 2 Hz. On the other hand, the result of the frequency analysis of the torque values in the hands off state, where the steering wheel 10 is not gripped by the driver, shows that the amplitude values are small in the region of 2 Hz or below, as shown in FIG. 3. As such, the characteristic of the torque value will vary depending on whether the driver grips the steering wheel 10. The present disclosure may detect hands on/off based on the torque value of the steering wheel 10 by using the characteristic.

To this end, the hands on/off detecting apparatus 100 may include a torque sensor 110 and an electronic control unit (ECU) 120.

The torque sensor 110 may sense a torque value of the steering wheel 10.

The ECU 120, which may include at least a processor, may perform a frequency analysis based on the torque value received from the torque sensor 110 to detect whether the driver grips the steering wheel.

That is, the ECU 120 may perform a frequency analysis based on the torque value to obtain an amplitude value in a predetermined reference frequency domain, and detect whether the driver grips the steering wheel 10 by using the amplitude value and the predetermined amplitude reference value.

Here, the reference frequency domain refers to a frequency band utilized to detect whether the steering wheel 10 is being gripped by the driver, and may be pre-tuned to the vehicle and set to a specific frequency band, such as "a frequency band of 2 Hz or below," and the like. The amplitude reference value refers to a reference value used to determine whether the steering wheel 10 is gripped, and may be pre-tuned to the vehicle and set to a specific value, such as "0.005".

In this case, the ECU 120 may also obtain a reference frequency domain and an amplitude reference value corresponding to the current speed of the vehicle by using reference information in which the reference frequency domain and the amplitude reference value are mapped by each vehicle speed. For example, based on reference information that is pre-tuned and set for the vehicle (for example, a reference frequency domain and an amplitude reference value for each vehicle speed), the ECU 120 may obtain a reference frequency domain and an amplitude reference value for the current speed of the vehicle, and detect whether the driver grips the steering wheel 10 by using the obtained reference frequency domain and amplitude reference value.

Referring to FIG. 4 for a more detailed description, the ECU 120 may perform a frequency analysis based on the torque value during a predetermined analysis time to obtain an amplitude value in a reference frequency domain. Here, the analysis time represents the unit time to collect the torque value used for the frequency analysis, which may be set to "5 seconds", "10 seconds", and the like. For example, when the analysis time is set to "5 seconds", the ECU 120 may perform a frequency analysis based on the torque value collected during "5 seconds" to obtain an amplitude value in the reference frequency domain.

In other words, the ECU 120 may convert the torque value during the analysis time from the time domain to the frequency domain to obtain an amplitude value in the reference frequency domain.

Then, the ECU 120 may detect whether the driver grips the steering wheel 10 by comparing the amplitude value to an amplitude reference value.

That is, when the amplitude value is less than the amplitude reference value, the ECU 120 may determine that the steering wheel 10 is in a hands off state in which the driver does not grip the steering wheel 10. On the other hand, when the amplitude value is equal to or greater than the amplitude reference value, the ECU 120 may determine that the steering wheel 10 is in a hands on state in which the driver grips the steering wheel 10.

In this case, the ECU 120 may also detect whether the driver grips the steering wheel 10 by using a sliding window method, as illustrated in FIGS. 5 and 6.

Here, the sliding window method has an analysis time as a window size, and may move by a predetermined number of times at intervals of the measurement period of the torque sensor 110.

That is, the ECU 120 may obtain a hands off counter based on the amplitude value and the amplitude reference value by using the sliding window method, as shown in FIG. 5.

Here, when the obtained amplitude value based on the torque value during the analysis time corresponding to the current window is less than the amplitude reference value, the ECU 120 may increase and store in a memory of the hands on/off detecting apparatus 100 the value of the hands off counter from a preset initial value prestored in the memory if the operation of the hands on/off detecting apparatus 100 is an initial operation for a current window, or may increase and store in the memory the value of the hands off counter from a most recent value stored in the memory if the operation of the hands on/off detecting apparatus 100 is after the initial operation for the current window, as shown in FIG. 6. On the other hand, when the amplitude value is equal to or greater than the amplitude reference value, the ECU 120 may decrease and store in the memory of the hands on/off detecting apparatus 100 the value of the hands off counter from the preset initial value prestored in the memory if the operation of the hands on/off detecting apparatus 100 is an initial operation for a current window, or may decrease and store in the memory the value of the hands off counter from a most recent value stored in the memory if the operation of the hands on/off detecting apparatus 100 is after the initial operation for the current window, as shown in FIG. 6. In one example, the hands off counter may be configured to store the preset initial value or the most recent value, and in this case, the memory to store the preset initial value or the most recent value may be omitted. For example, when the amplitude value is less than the amplitude reference value, the ECU 120 may increase the value of the hands off counter by adding "1" to the value of the hands off counter, and when the amplitude value is equal to or greater than the amplitude reference value, the ECU 120 may decrease the value of the hands off counter by subtracting "1" from the value of the hands off counter.

In this way, the ECU 120 may perform the process of updating the hands off counter in the current window, of which the size is the analysis time, and updating the hands off counter in a window that is shifted one space from the current window by the measurement period of the torque sensor 110, while moving a predetermined number of times.

The ECU 120 may detect whether the driver grips the steering wheel 10 based on the hands off counter, as shown in FIG. 5.

That is, when the hands off counter obtained by using the sliding window method is equal to or greater than the predetermined counter reference value, the ECU 120 may determine that the steering wheel 10 is in the hands off state in which the driver does not grip the steering wheel 10. On the other hand, when the hands off counter is less than the counter reference value, the ECU 120 may determine that the steering wheel 10 is in the hands on state in which the driver grips the steering wheel 10.

For example, the ECU 120 may detect whether the driver grips the steering wheel 10 by comparing the hands off counter that is latest or nearest obtained according to the sliding window method and the counter reference value.

The ECU 120 may provide warning information when it is determined that the steering wheel 10 is in the hands off state where the driver does not grip the steering wheel 10.

For example, the ECU 120 may provide warning information to the driver by outputting the warning information in audio form through a speaker or the like, by generating a vibration in the driver's seat, by generating a vibration in the driver's seat belt by using other systems in the vehicle, or by outputting the warning information in visual form through a display module or the like.

In this case, when it is determined that the steering wheel 10 is in the hands off state, the ECU 120 may also provide warning information when a predetermined warning condition is met.

Here, the warning condition may include at least one of the case where the current speed of the vehicle is greater than a predetermined reference speed, the case where an advanced driver assistance systems (ADAS) function is operating, the case where the vehicle is traveling straight, and the case where the vehicle is traveling in reverse.

In other words, when it is determined that the steering wheel 10 is in the hands off state in which the driver does not grip the steering wheel 10, the ECU 120 may provide the warning information to the driver only when the warning condition is met, rather than providing the warning information to the driver in bulk. For example, a driver constantly grips the steering wheel 10 when the driver directly operates the vehicle, but may often not grip the steering wheel 10 when the ADAS function is activated and the vehicle is driving autonomously. Accordingly, the present disclosure may provide warning information to the driver to induce gripping of the steering wheel 10 when it is determined that the steering wheel 10 is in the hands off state and the ADAS function is in operation. Similarly, the driver does not often grip the steering wheel 10 even when the vehicle is traveling straight. Accordingly, the present disclosure may provide warning information to the driver to induce gripping of the steering wheel 10 when it is determined that the steering wheel 10 is in the hands off state and the vehicle is traveling straight.

In this case, the ECU 120 may determine that the vehicle is traveling straight when a predetermined straight-travelling condition is met. Herein, the straight-travelling condition refers to the case where a steering angle is less than a predetermined reference value (for example, "3 degrees"), the case where a steering angle speed is less than a predetermined reference value (for example, "4 degrees/second"), the case where a yaw rate is less than a predetermined reference value (for example, "0.5 degrees/second"), and the case where a left and right difference in wheel speed is less than a predetermined reference value (for example, "0.5 kph").

Then, a method for detecting hands on/off of a steering wheel according to an embodiment of the present disclosure will be described with reference to FIG. 7.

Figure 7:
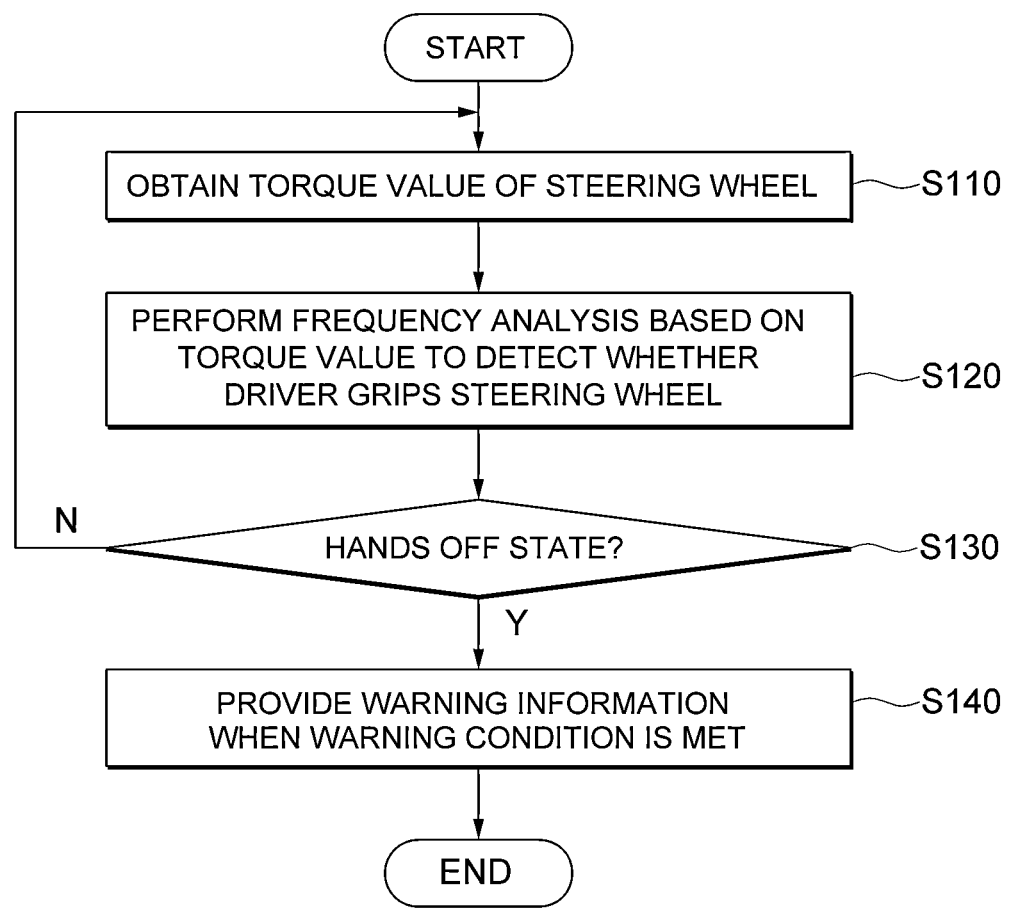
FIG. 7 is a flow diagram illustrating a method of detecting hands on/off of a steering wheel according to an embodiment of the present disclosure.

FIG. 7 is a flow diagram illustrating a method of detecting hands on/off of a steering wheel according to an embodiment of the present disclosure.

Referring to FIG. 7, the ECU 120 of the hands on/off detecting apparatus 100 may obtain a torque value of the steering wheel 10 through the torque sensor 110 (S110).

The ECU 120 may then perform a frequency analysis based on the torque value to detect whether the driver grips the steering wheel 10 (S120).

That is, the ECU 120 may perform a frequency analysis based on the torque value to obtain an amplitude value in a predetermined reference frequency domain, and detect whether the driver grips the steering wheel 10 by using an amplitude value and a predetermined amplitude reference value.

In this case, the ECU 120 may also obtain a reference frequency domain and an amplitude reference value corresponding to the current speed of the vehicle by using reference information in which the reference frequency domain and the amplitude reference value are mapped by each vehicle speed.

For a more detailed description, the ECU 120 may perform the frequency analysis based on the torque value during an analysis time to obtain an amplitude value in a reference frequency domain. That is, the ECU 120 may convert the torque value during the analysis time from the time domain to the frequency domain to obtain an amplitude value in the reference frequency domain. Then, the ECU 120 may detect whether the driver grips the steering wheel 10 by comparing the amplitude value to an amplitude reference value. That is, when the amplitude value is less than the amplitude reference value, the ECU 120 may determine that the steering wheel 10 is in a hands off state in which the driver does not grip the steering wheel 10. On the other hand, when the amplitude value is equal to or greater than the amplitude reference value, the ECU 120 may determine that the steering wheel 10 is in a hands on state in which the driver grips the steering wheel 10.

In this case, the ECU 120 may also detect whether the driver grips the steering wheel 10 by using a sliding window method. That is, the ECU 120 may obtain a hands off counter based on the amplitude value and the amplitude reference value by using the sliding window method. Here, when the amplitude value obtained based on the torque value during the analysis time corresponding to the current window is less than the amplitude reference value, the ECU 120 may increase the value of the hands off counter. On the other hand, when the amplitude value is equal to or greater than the amplitude reference value, the ECU 120 may decrease the value of the hands off counter. Further, the ECU 120 may detect whether the driver grips the steering wheel 10 based on the hands off counter. That is, when the hands off counter obtained using the sliding window method is equal to or greater than the counter reference value, the ECU 120 may determine that the steering wheel 10 is in a hands off state in which the driver does not grip the steering wheel 10. On the other hand, when the hands off counter is less than the counter reference value, the ECU 120 may determine that the steering wheel 10 is in the hands on state in which the driver grips the steering wheel 10.

When the steering wheel 10 is in the hands off state as a result of the detection (S130-Y), the ECU 120 may provide warning information when a warning condition is met (S140).

Although all of the components configuring the exemplary embodiments of the invention described above are described as being combined or operating in combination, the present disclosure is not necessarily limited to these exemplary embodiments. That is, within the range of the object of the present disclosure, one or more components among all of the constituent elements may also be selectively combined and operated. All of the components may be implemented as separate pieces of hardware, but may also be implemented as a computer program having program modules in which some or all of the components are optionally combined to perform some or all of the combined functions on one or more pieces of hardware. Further, the computer program is stored in a non-transitory computer readable medium, such as a USB memory, a CD disk, and a flash memory, and read and executed by a processor of the hands on/off detecting apparatus or a computer, to implement the exemplary embodiment of the present disclosure. Recording medium for computer programs may include magnetic recording medium, optical recording medium, and the like.

Although the exemplary embodiment of the present disclosure has been described for illustrative purposes, those skilled in the art will appreciate that various modifications, additions and substitutions are possible, without departing from the essential characteristic of the invention. Therefore, the exemplary embodiments disclosed in the present disclosure and the accompanying drawings are not intended to limit the technical spirit of the present disclosure, but are intended to illustrate the scope of the technical idea of the present disclosure, and the scope of the present disclosure is not limited by the exemplary embodiment and the accompanying drawings. The scope of the present disclosure shall be construed on the basis of the accompanying claims in such a manner that all of the technical ideas included within the scope equivalent to the claims belong to the scope of the present disclosure.

What is claimed is:

1. An apparatus for detecting hands on/off of a steering wheel, the apparatus comprising:
   a torque sensor configured to sense a torque value of a steering wheel; and
   an Electronic Control Unit (ECU) configured to detect whether a driver grips the steering wheel by performing a frequency analysis based on the torque value received from the torque sensor,
   wherein, based on a sliding window method which has a predetermined analysis time as a window size and moves by a predetermined number of times at intervals of a measurement period of the torque sensor, the ECU is configured to obtain a hands off counter based on an amplitude value and a predetermined amplitude reference value, and to detect whether the driver grips the steering wheel based on the hands off counter.

2. The apparatus of claim 1, wherein the ECU is configured to perform the frequency analysis based on the torque value to obtain the amplitude value in a predetermined reference frequency domain, and detects whether the driver grips the steering wheel based on the amplitude value and the predetermined amplitude reference value.

3. The apparatus of claim 2, wherein the ECU is configured to perform the frequency analysis based on the torque value for the predetermined analysis time to obtain the amplitude value in the reference frequency domain.

4. The apparatus of claim 3, wherein the ECU is configured to convert the torque value for the analysis time from a time domain to a frequency domain to obtain the amplitude value in the reference frequency domain.

5. The apparatus of claim 4, wherein in response to a determination that the amplitude value is less than the amplitude reference value, the ECU is configured to determine that the steering wheel is in a hands off state in which the driver does not grip the steering wheel, and in response to a determination that the amplitude value is equal to or greater than the amplitude reference value, the ECU is configured to determine that the steering wheel is in a hands on state in which a driver grips the steering wheel.

6. The apparatus of claim 1, wherein in response to a determination that the amplitude value obtained based on the torque value during the analysis time corresponding to a current window is less than the amplitude reference value, the ECU is configured to increase the value of the hands off counter, and in response to a determination that the amplitude value is equal to or greater than the amplitude reference value, the ECU is configured to decrease the value of the hands off counter.

7. The apparatus of claim 6, wherein in response to a determination that the hands off counter obtained based on the sliding window method is equal to or greater than a predetermined counter reference value, the ECU is configured to determine that the steering wheel is in a hands off state in which the driver does not grip the steering wheel, and in response to a determination that the hands off counter is less than the counter reference value, the ECU is configured to determine that the steering wheel is in a hands on state in which the driver grips the steering wheel.

8. The apparatus of claim 2, wherein the ECU is configured to obtain the reference frequency domain and the amplitude reference value corresponding to a current speed of a vehicle based on reference information in which the reference frequency domain and the amplitude reference value are mapped for each vehicle speed.

9. The apparatus of claim 1, wherein in response to a determination that the steering wheel is in a hands off state in which the driver does not grip the steering wheel, the ECU is configured to provide warning information when a predetermined warning condition is met.

10. The apparatus of claim 9, wherein the warning condition includes at least one of a case where a current speed of a vehicle is greater than a predetermined reference speed, a case where an Advanced Driver Assistance Systems (ADAS) function is operating, a case where the vehicle is traveling straight, and a case where the vehicle is traveling in reverse.

11. A method of detecting hands on/off of a steering wheel, the method comprising:
    obtaining, by an Electronic Control Unit (ECU), the steering wheel's torque value sensed by a torque sensor;
    performing, by the ECU, a frequency analysis based on the torque value sensed by the torque sensor; and
    detecting, by the ECU, whether a driver grips the steering wheel based on the frequency analysis,
    wherein the detecting, by the ECU, includes:
      obtaining, by the ECU, an amplitude value in a predetermined reference frequency domain based on the frequency analysis;
      obtaining, by the ECU, a hands off counter based on the amplitude value and a predetermined amplitude reference value by using a sliding window method, wherein the sliding window method has a predetermined analysis time as a window size and moves by a predetermined number of times at intervals of a measurement period of the torque sensor; and
      detecting, by the ECU, whether the driver grips the steering wheel based on the hands off counter.

12. The method of claim 11, wherein the detecting includes performing, by the ECU, the frequency analysis based on the torque value for the predetermined analysis time to obtain the amplitude value in the reference frequency domain.

13. The method of claim 12, wherein the detecting includes converting, by the ECU, the torque value for the analysis time from a time domain to a frequency domain to obtain the amplitude value in the reference frequency domain.

14. The method of claim 13, wherein the detecting includes:
    determining, by the ECU, that the steering wheel is in a hands off state in which the driver does not grip the steering wheel in response to a determination that the amplitude value is less than the amplitude reference value; and
    determining, by the ECU, that the steering wheel is in a hands on state in which the driver grips the steering wheel in response to a determination that the amplitude value is equal to or greater than the amplitude reference value.

15. The method of claim 11, wherein the detecting includes:
- increasing, by the ECU, the value of the hands off counter in response to a determination that the amplitude value obtained based on the torque value during the analysis time corresponding to a current window is less than the amplitude reference value; and
- decreasing, by the ECU, the value of the hands off counter in response to a determination that the amplitude value is equal to or greater than the amplitude reference value.

16. The method of claim 15, wherein the detecting includes:
- determining, by the ECU, that the steering wheel is in a hands off state in which the driver does not grip the steering wheel in response to a determination that the hands off counter obtained based on the sliding window method is equal to or greater than a predetermined counter reference value; and
- determining, by the ECU, that the steering wheel is in a hands on state in which the driver grips the steering wheel in response to a determination that the hands off counter is less than the counter reference value.

17. The method of claim 11, wherein the detecting includes obtaining, by the ECU, the reference frequency domain and the amplitude reference value corresponding to a current speed of the vehicle based on reference information in which the reference frequency domain and the amplitude reference value are mapped for each vehicle speed.

18. A non-transitory computer readable medium storing a computer program, when executed by a processor, to cause the processor to:
- receive a torque value of a steering wheel from a torque sensor;
- perform a frequency analysis based on the torque value received from the torque sensor; and
- detect whether a driver grips the steering wheel based on a result of the frequency analysis, wherein the computer program, when executed by the processor, further causes the processor to:
- based on a sliding window method which has a predetermined analysis time as a window size and moves by a predetermined number of times at intervals of a measurement period of the torque sensor, obtain a hands off counter based on an amplitude value and a predetermined amplitude reference value; and
- detect whether the driver grips the steering wheel based on the hands off counter.

19. The medium of claim 18, wherein the computer program, when executed by the processor, further causes the processor to perform the frequency analysis based on the torque value to obtain the amplitude value in a predetermined reference frequency domain, and detect whether the driver grips the steering wheel based on the amplitude value and the predetermined amplitude reference value.

20. The medium of claim 19, wherein the computer program, when executed by the processor, further causes the processor to perform the frequency analysis based on the torque value for the predetermined analysis time to obtain the amplitude value in the reference frequency domain.

21. The medium of claim 20, wherein the computer program, when executed by the processor, further causes the processor to convert the torque value for the analysis time from a time domain to a frequency domain to obtain the amplitude value in the reference frequency domain.

22. The medium of claim 21, wherein the computer program, when executed by the processor, further causes the processor to:
- in response to a determination that the amplitude value is less than the amplitude reference value, determine that the steering wheel is in a hands off state in which the driver does not grip the steering wheel; and
- in response to a determination that the amplitude value is equal to or greater than the amplitude reference value, determine that the steering wheel is in a hands on state in which a driver grips the steering wheel.

* * * * *